US007322522B2

(12) United States Patent
Fujiwara et al.

(10) Patent No.: US 7,322,522 B2
(45) Date of Patent: Jan. 29, 2008

(54) IDENTIFICATION FUNCTION PAPER AND IDENTIFICATION CARD

(75) Inventors: Katsuhisa Fujiwara, Shikokuchuou (JP); Masaaki Morikawa, Shikokuchuou (JP); Satoshi Yamamoto, Kodaira (JP); Kousaku Nagashima, Kumagaya (JP); Taiga Matsushita, Warabi (JP); Tatsuo Senba, Shikokuchuou (JP)

(73) Assignees: Lintec Corporation, Tokyo (JP); Ehime Prefectural Government, Ehime (JP)

( * ) Notice: Subject to any disclaimer, the term of this patent is extended or adjusted under 35 U.S.C. 154(b) by 0 days.

(21) Appl. No.: 10/989,508

(22) Filed: Nov. 17, 2004

(65) Prior Publication Data

US 2005/0121527 A1 Jun. 9, 2005

(30) Foreign Application Priority Data

Nov. 19, 2003 (JP) ............................ 2003-389766
Sep. 9, 2004 (JP) ............................ 2004-262567

(51) Int. Cl.
*G06K 7/08* (2006.01)

(52) U.S. Cl. ........................ 235/449; 235/439; 235/493

(58) Field of Classification Search ................ 235/449, 235/375, 380, 493, 487, 488, 439
See application file for complete search history.

(56) References Cited

U.S. PATENT DOCUMENTS 4,114,032 A * 9/1978 Brosow et al. ............. 235/493
4,510,020 A 4/1985 Green et al.
4,671,839 A * 6/1987 Finkel et al. ............... 156/257
5,013,900 A * 5/1991 Hoppe ........................ 235/492
5,143,583 A 9/1992 Marchessault et al.
5,698,839 A * 12/1997 Jagielinski et al. ......... 235/493
5,717,381 A * 2/1998 Jagielinski et al. ......... 340/551
5,756,220 A * 5/1998 Hoshino et al. ......... 428/537.5
5,830,548 A * 11/1998 Andersen et al. .......... 428/36.4
5,844,230 A * 12/1998 Lalonde ...................... 235/487
5,949,050 A * 9/1999 Fosbenner et al. .......... 235/449
5,959,289 A * 9/1999 Okada et al. ............... 235/487
5,975,420 A * 11/1999 Gogami et al. ............. 235/492
6,053,406 A * 4/2000 Litman ....................... 235/449
6,328,342 B1 * 12/2001 Belousov et al. ............. 283/91
6,622,913 B1 * 9/2003 Antonenco et al. ......... 235/449
6,673,465 B2 * 1/2004 Lordi ...................... 428/537.5
6,902,116 B2 * 6/2005 Finkelstein ................. 235/492
6,987,868 B1 * 1/2006 Atarashi et al. ............ 382/112
2003/0194578 A1 * 10/2003 Tam et al. .................. 428/690
2005/0180020 A1 * 8/2005 Steenblik et al. ........... 359/626
2007/0080533 A1 * 4/2007 Bleikholm et al. ........... 283/72

FOREIGN PATENT DOCUMENTS

JP 06-028707 A 2/1994
JP 06-093564 A 4/1994

* cited by examiner

*Primary Examiner*—Thien M. Le
*Assistant Examiner*—Edwyn Labaze
(74) *Attorney, Agent, or Firm*—Birch, Stewart, Kolasch & Birch, LLP

(57) ABSTRACT

The present invention provides identification functional paper which allows secure measurement of a change in signal caused by a magnetic material and excels in waveform reproducibility when measuring a single specimen two or more times, and an identification card including the identification functional paper. The identification functional paper includes a magnetized fiber obtained by filling the fiber inner cavity with a magnetic material, and the identification card includes the identification functional paper.

19 Claims, 1 Drawing Sheet

IDENTIFICATION FUNCTION PAPER AND IDENTIFICATION CARD

TECHNICAL FIELD

The present invention relates to identification functional paper suitable for card-shaped products which must be prevented from being counterfeited and of which genuineness is checked, such as bank cards, credit cards, prepaid cards, or various tickets such as securities, gift certificates, and vehicle tickets, and to an identification card comprising the identification functional paper.

BACKGROUND ART

Magnetic fibrous products which must be prevented from being counterfeited and which are provided with a genuineness checking function have been proposed.

For example, Patent Document 1 proposes a magnetic cellulose material, in which a metal oxide mainly containing magnetic iron is deposited in a cellulose material, obtained by immersing a cellulose material in a metal salt solution, adjusting the pH and temperature of the solution, and subjecting the solution to a heat treatment or the like. However, the magnetic cellulose material obtained by this method has inferior magnetic properties due to small magnetic material content. Moreover, since the magnetic material adheres to the vicinity of the fiber surface, the paper strength is decreased.

Patent Document 2 proposes counterfeit prevention paper obtained by preparing a magnetic polymer element by mixing magnetic metal powder into a synthetic resin solution and jetting the resulting solution into a coagulating solution from a nozzle, cutting the magnetic polymer element to a length of about 2 to 10 mm, and forming the magnetic polymer elements into paper together with pulp fibers. However, since the magnetized fiber described in this document requires a complicated manufacturing apparatus, it is disadvantageous from the viewpoint of manufacturing cost when manufacturing the magnetized fibers in a small lot. Moreover, since the resulting magnetized fibers have inferior self-adhesion, the magnetized fibers are easily removed from the paper.

Patent Document 3 proposes counterfeit prevention paper containing a magnetic fibrous product obtained by causing magnetic particles with an average particle size of 0.1 to 100 μm to adhere to the surface of a fibrous product with a weight average fiber length of 5 mm or less using a dry impact blending method. However, since the magnetic material adheres to the vicinity of the fiber surface, the counterfeit prevention paper obtained by this method decreases the paper strength.

Patent Document 4 and Non-Patent Documents 1 to 4 disclose magnetized fibers containing a magnetic material in the fiber inner cavity and methods of manufacturing the magnetized fibers in relation to the present invention.

[Patent Document 1] Japanese Patent Publication No. 4-12738

[Patent Document 2] Japanese Patent Application Laid-open No. 7-214955

[Patent Document 3] Japanese Patent Application Laid-open No. 11-107161

[Patent Document 4] Japanese Patent Application Laid-open No. 6-93564

[Non-Patent Document 1] Japan Tappi Journal, vol. 57, (3), p. 106, 2003

[Non-Patent Document 2] Japan Tappi Journal, vol. 57, (4), p. 90, 2003

[Non-Patent Document 3] Japan Tappi Journal, vol. 57, (5), p. 112, 2003

[Non-Patent Document 4] Japan Tappi Journal, vol. 57, (7), p. 112, 2003

The present invention has been achieved in view of the above-described conventional technologies. An object of the present invention is to provide identification functional paper which allows secure measurement of a change in signal caused by a magnetic material and excels in waveform reproducibility when measuring a single specimen two or more times, and an identification card comprising the identification functional paper.

DISCLOSURE OF THE INVENTION

Figure 1:
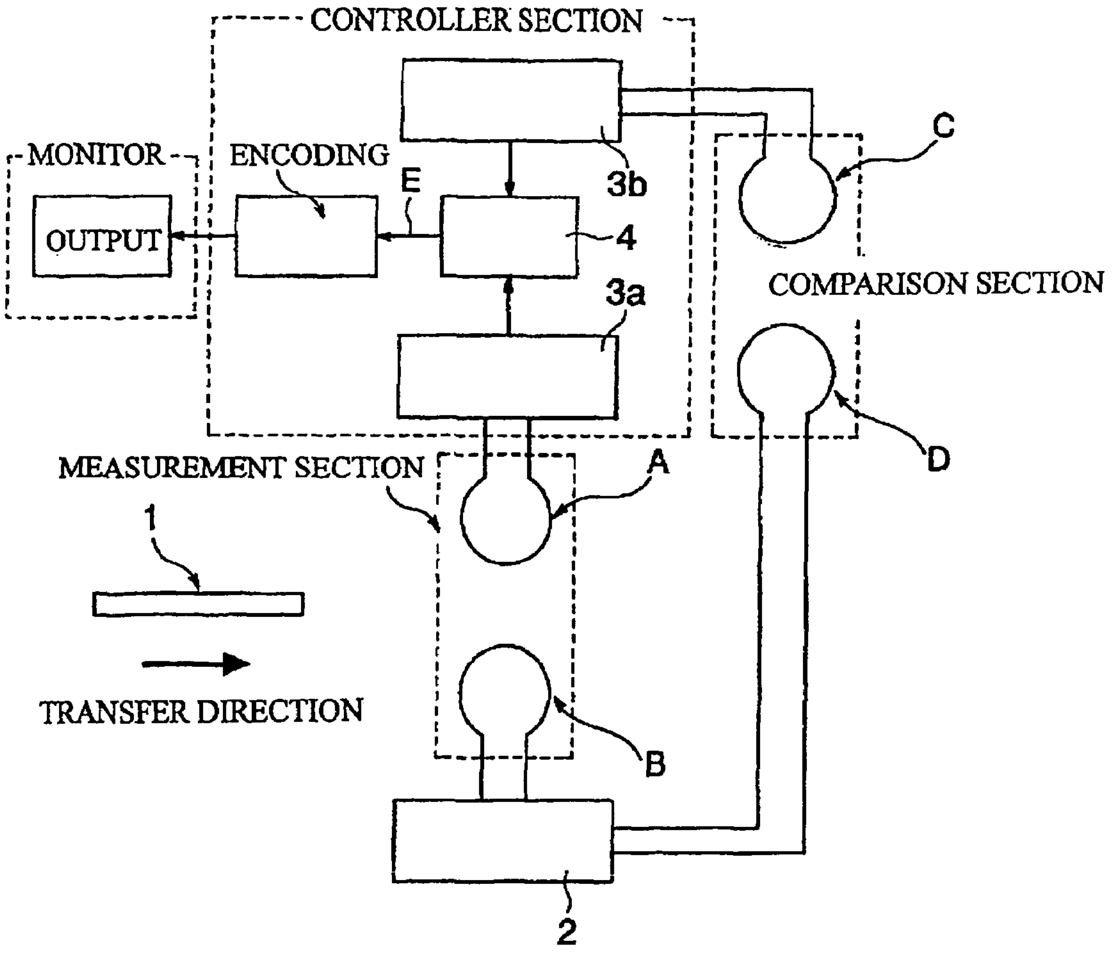
FIG. 1 is a conceptual diagram of a measurement device which has functions of detecting, dividing, encoding (encrypting), and outputting a specific detection signal (A) obtained corresponding to the pattern of a magnetic material included in identification functional paper of the present invention.

The present inventors have conducted extensive studies on the magnetic paper obtained by the methods described in Patent Document 4 and Non-Patent Documents 1 to 4. As a result, the present inventors have found magnetic paper which (1) allows secure measurement of a change in signal caused by a magnetic material, (2) excels in waveform reproducibility when measuring a single specimen two or more times, and (3) excels in paper strength properties. This finding has led to the completion of the present invention.

According to a first aspect of the present invention, there is provided identification functional paper comprising a magnetized fiber obtained by filling a fiber inner cavity with a magnetic material.

In the identification functional paper of the present invention, it is preferable that the magnetized fiber include the magnetic material in an amount of 25 to 45 wt %. It is preferable that the identification functional paper comprise the magnetized fiber in an amount of 0.001 to 30 wt %, and comprise the magnetic material in an amount of 0.01 to 10 wt %.

According to a second aspect of the present invention, there is provided an identification card comprising the identification functional paper of the present invention.

According to the present invention, identification functional paper suitable for card-shaped products which must be prevented from being counterfeited and of which genuineness is checked, such as bank cards, credit cards, prepaid cards, or various tickets such as securities, gift certificates, and vehicle tickets, and an identification card comprising the identification functional paper can be provided.

The identification functional paper and the identification card of the present invention allow secure measurement of a change in signal caused by a magnetic material and excel in waveform reproducibility when measuring a single specimen two or more times, and therefore have a counterfeit prevention function.

BEST MODE FOR CARRYING OUT THE INVENTION

The present invention is described below in detail.

1) Identification Functional Paper

The identification functional paper of the present invention includes a magnetized fiber obtained by filling the fiber inner cavity with a magnetic material.

(1) Fiber

The fiber used in the present invention is a hollow fiber having an inner cavity. For example, natural fibers such as needle-leaved bleached kraft pulp (NBKP), needle-leaved bleached sulfite pulp (NBSP), or thermomechanical pulp (TMP) may be used. An artificial hollow fiber such as rayon, vinylon, polyester, polypropylene, nylon, or acrylic fiber may also be used.

The fineness and length of the artificial hollow fiber are usually 2 to 15 decitex (dtex) and about 1 to 10 mm, respectively. The degree of hollowness is about 3 to 20%.

(2) Magnetic Material

The magnetic material used in the present invention is not particularly limited insofar as the magnetic material is a magnetic material known in the art. For example, magnetite, manganese ferrite, manganese zinc ferrite, and the like can be given. The magnetic material usually has an average diameter of 0.1 to 0.5 μm and a grain size distribution of 0.01 to 0.9 μm.

The content of the magnetic material in the magnetized fiber of present invention is preferably 25 to 45 wt %, and still more preferably 28 to 45 wt %. The higher the content, the greater the magnetism.

(3) Magnetized Fiber

The magnetized fiber may be manufactured as described below, for example.

Specifically, a metal salt aqueous solution containing a water-soluble salt of a metal which forms the above-described magnetic material is prepared. As the metal salt to be used, a ferrous salt or a metal salt containing a ferrous salt and a divalent metal salt such as manganese, zinc, cobalt, nickel, barium, and strontium in an amount of about 0 to 1 mol for 1 mol of the ferrous salt is preferable. The concentration of the metal salt aqueous solution is usually 0.01 to 0.4 M.

Then, natural or artificial hollow fibers are dispersed in the metal salt aqueous solution thus prepared to obtain a fiber dispersion liquid. The dispersion concentration of the hollow fibers in the metal salt aqueous solution is determined in relation to stirring of the aqueous solution. The dispersion concentration is preferably 0.01 to 3 wt %. As the dispersing method, the hollow fibers are added to the metal salt aqueous solution so that each fiber is uniformly dispersed. After the addition of the hollow fibers, it is preferable to perform ultrasonic processing for about 1 to 3 hours since the metal ions are caused to deeply enter the hollow fibers.

Then, alkali is added to the resulting fiber dispersion liquid in an inert gas atmosphere such as nitrogen gas or helium gas to obtain a metal hydroxide solution. As the alkali to be added, an alkali which does not bond to an anion of the metal salt to form a precipitate is preferable. For example, a hydroxide of an alkali metal such as sodium hydroxide, ammonia, and the like can be given. The alkali is generally used in the form of an aqueous solution. Ammonia may be utilized in a gaseous form. The alkali is added in such an amount that a sufficient amount of the metal salt becomes a metal hydroxide.

The resulting metal hydroxide is oxidized to obtain a magnetic material. There are no specific limitations to the method for oxidizing the metal hydroxide. For example, a method of blowing oxygen gas or air into the metal hydroxide solution, a method of adding an oxidizing agent such as hydrogen peroxide to the metal hydroxide solution, and the like can be given.

The oxidation reaction is usually completed within several minutes to 10 hours. The endpoint of the reaction may be confirmed by a chemical analytical method known in the art. When using a ferrous salt, ferrous ions may be quantitatively analyzed with a bichromic acid normal solution using diphenylamine as an indicator, and a point at which a decrease in ferrous ions stops (constant weight) may be taken as the reaction endpoint.

After the oxidation reaction is completed, the magnetized fibers are isolated by using a separation method known in the art. The magnetic material adhering to the fiber surface is removed, if necessary. As the removal method, a method of placing the magnetized fibers in a 100-mesh stainless steel screen and slowly washing the magnetized fibers in a stream of water can be given, for example.

A magnetized fiber containing a magnetic material in the fiber inner cavity can be obtained in this manner. The fact that the magnetized fiber in which the fiber inner cavity is filled with the magnetic material was obtained may be confirmed by observation using an electron microscope or a quantitative analysis using an X-ray diffractometer, for example.

(4) Method of Manufacturing Identification Functional Paper

Identification functional paper may be manufactured by processing the magnetized fibers obtained as described above into paper by using a papermaking method known in the art.

The magnetized fibers are mixed with fibers which are not magnetized (wood pulp or the like), and the mixture is dispersed in water to prepare an aqueous dispersion with a total fiber concentration of about 0.1 to 1.0 wt %. An additive known in the art may be used in an amount of about 0.1 to 2.0 solid wt % of the total weight of the fibers. As the additive to be used, a dry strength agent, wet strength agent, sizing agent, fixing agent, yield improver, water filtration improver, anti-foaming agent, coloring dye, coloring pigment, fluorescent dye, and the like can be given.

The fiber dispersion mixed with the magnetized fibers thus obtained may be made into paper using a paper machine known in the art such as a Fourdrinier machine or a cylinder machine.

In the present invention, the mixing amount of the magnetized fibers is not particularly limited. The mixing amount of the magnetized fibers is usually 0.001 to 30 wt %, and preferably 0.01 to 10 wt % of the identification functional paper. The metric basis weight is about 10 to 200 g/m$^2$, and preferably 50 to 200 g/m$^2$ from the viewpoint of magnetism. The magnetism can be adjusted to some degree by changing the metric basis weight. After papermaking, the resulting paper is dehydrated and dried under pressure using a dryer to obtain the identification functional paper of the present invention.

The distribution of the magnetic fibers is 1 to 100 fiber/cm$^2$, and preferably 5 to 30 fiber/cm$^2$.

Identification functional paper in which the magnetized fibers obtained by filling the fiber inner cavity with the magnetic material are dispersed can be obtained in this manner.

The identification functional paper of the present invention has excellent paper strength properties. The breaking length (km) of the identification functional paper of the present invention measured according to JIS P 8113 is preferably 5 to 8, and the bursting strength ($kPa\cdot m^2/g$) of the identification functional paper of the present invention measured according to JIS P 8112 is preferably 200 to 600. The content of the magnetic material in the identification functional paper of the present invention is preferably 0.01 to 10 wt %, and particularly preferably 0.02 to 5 wt %.

The identification functional paper of the present invention allows a detection signal corresponding to the distribution state of the magnetic material to be securely read (specifically, excels in magnetic response properties) when formed into an identification card as described later, and excels in reproducibility of the detection signal (specifically, excels in magnetic reproducibility) when measuring the single identification functional paper two or more times.

Starch, polyvinyl alcohol, various surface sizes, and the like may optionally be applied to the surface of the identification functional paper of the present invention using a size press machine or the like.

2) Identification Card

The identification functional paper obtained by the present invention may be used as an identification card by cutting the identification functional paper to a predetermined size in the shape of a card.

The identification card of the present invention differs from each other in the distribution state of the magnetic material contained therein. Specifically, information which reflects the distribution state of the magnetic material is information specific to each identification card. Therefore, whether or not the identification card of the present invention is genuine can be judged by storing a specific detection signal (A) obtained corresponding to the distribution state of the magnetic material included in the identification card, measuring a specific detection signal (B) corresponding to the distribution state of the magnetic material included in the identification card as the inspection target, and comparing the detection signal (A) with the detection signal (B).

Whether or not the identification card of the present invention is genuine may be judged as described below.

Step (1)

The specific detection signal (A) obtained corresponding to the pattern of the magnetic material included in the identification card of the present invention is stored.

The specific detection signal (A) obtained corresponding to the pattern of the magnetic material may be detected by using a device shown in FIG. 1, for example.

The device shown in FIG. 1 includes two pairs of coils (measurement section and comparison section), a high-frequency transmitter 2, a controller section, and a monitor (output section). A measurement specimen 1 is transferred in the direction indicated by an arrow in FIG. 1, and passes through the midpoint between coils A and B. The measurement specimen 1 is transferred using a card feeder at a constant speed. A single transmitter is connected with the coils B and D and generates an equal magnetic field. Since the coils A and B and the coils C and D are respectively magnetically coupled and the distance between the coils A and B and the distance between the coils C and D are equal, the alternating magnetic fields applied to the coils A and C are equal.

The controller section includes A/D converters 3*a* and 3*b* which perform A/D conversion of voltages applied to the coils A and C, a divider 4, and a section which encodes (encrypts) a signal.

These functions are entirely managed by a personal computer.

Since the voltages applied to the coils A and C are equal in a state in which nothing (no specimen) is present between the coils A and B, the output result from the divider 4 becomes "1" (division rule is "voltage value of coil C÷voltage value of coil A"; hereinafter the same).

When the measurement specimen 1 including the magnetic material is positioned between the coils A and B, the magnetic field is blocked by the magnetic material, whereby the voltage applied to the coil A is decreased. The degree of decrease is maximum at the midpoint between the coils A and B and becomes smaller as the distance from the midpoint increases. The output result from the divider 4 changes (becomes a value such as 1.25 or 1.5, for example) when the voltage of the coil A is decreased.

Figure 2:
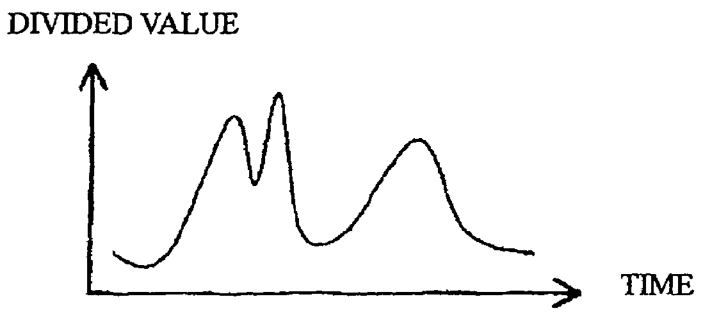
FIG. 2 is a time-based graph drawn by sampling a waveform output from a divider 4 at a point E shown in FIG. 1.

FIG. 2 shows a time-based graph drawn by sampling the waveform output from the divider 4 at a point E shown in FIG. 1. In code generation, the waveform is converted into "0" or "1 " according to a predetermined rule, and is output to the monitor as a 12-digit value (encryption).

The output data (detection signal (A)) can be stored in a database of the personal computer. The detection signal (A) may be used for judgment by storing the detection signal (A) in the identification card by means of a magnetic recording zone, an IC chip, a barcode printing, or the like provided on the surface or inside of the identification card.

Step (2)

The detection signal (B) corresponding to the pattern of the magnetic material included in the identification card to be inspected is detected. The detection method for the detection signal (B) must be the same as the detection method for the detection signal (A).

Step (3)

The detection signal (A) is compared with the detection signal (B).

The comparison operation may be performed by using a program which compares the detection signal (B) with the detection signal (A) stored in the database, displays the name of the specimen on the monitor when the detection signal (B) coincides with the detection signal (A), and displays a message "false" when the detection signal (B) does not coincide with the detection signal (A).

According to this method, whether or not the identification card of the present invention is genuine can be confirmed conveniently and securely.

EXAMPLES

The present invention is described below in more detail by examples and comparative examples. However, the following description merely illustrates examples, and the manufacturing method, the content of the magnetic material, and the like are not necessarily limited to the following examples.

Example 1

(1) Preparation of Magnetized Fiber

Ferrous sulfate heptahydrate (0.36 mol, 100 g) was dissolved in pure water to obtain 1000 ml of a solution. 5 g of NBKP ("Prince-George" manufactured by Canfor Prince-George) was mixed with the solution, and the pH of the solution was adjusted to 4.0. After providing ultrasonic processing for two hours in order to promote entrance of the ferrous ions into the fiber (pulp) inner cavity, a sodium hydroxide solution was added dropwise as alkali in a nitrogen gas atmosphere so as to have a predetermined equivalent for the ferrous ions to form ferrous hydroxide. After heating the reaction solution to 80° C., the nitrogen gas was replaced with air, and the ferrous hydroxide was oxidized for five hours. The resulting product was sufficiently washed using a 100-mesh screen. The washed product was sufficiently dried at 110° C. to obtain magnetized fibers. The resulting magnetized fibers were sintered at 900° C., and the inorganic content was measured.

As a result, the resulting fiber (pulp) had an inorganic content of 30 wt %. As a result of electron microscope observation, it was confirmed that the fiber inner cavity was filled with an inorganic material. And as a result of quantitative analysis using an X-ray diffractometer, it was confirmed that the inorganic material was magnetite. In other words, a magnetized fiber in which the fiber inner cavity was filled with magnetite, which is a magnetic material, was obtained by the precipitation method.

(2) Preparation of Identification Functional Paper

The magnetized fibers obtained as described above and commercially available NBKP ("Mackenzie" manufactured by British Columbia Forest Products Ltd.) adjusted to a Canadian degree of beating of 500 ml were mixed at a ratio of 5:95 (weight ratio) so that the content (mixing amount) of the magnetized fibers was 5 wt % to prepare handmade paper with a metric basis weight of 85 g/m$^2$ according to JIS P 8222 to obtain identification functional paper of Example 1.

Example 2

The above magnetized fibers and commercially available NBKP ("Mackenzie" manufactured by British Columbia Forest Products Ltd.) adjusted to a Canadian degree of beating of 500 ml were mixed at a ratio of 1:99 (weight ratio) so that the content of the magnetized fibers was 1 wt % to prepare handmade paper with a metric basis weight of 85 g/m$^2$ according to JIS P 8222 to obtain identification functional paper of Example 2.

Example 3

Identification functional paper of Example 3 was obtained in the same manner as in Example 1 except for changing the metric basis weight to 180 g/m$^2$.

Example 4

Identification functional paper of Example 4 was obtained in the same manner as in Example 1 except for mixing the magnetized fibers and commercially available NBKP ("Mackenzie" manufactured by British Columbia Forest Products Ltd.) at a ratio of 0.1:99.9 (weight ratio) so that the content of the magnetized fibers was 0.1 wt %.

Comparative Example 1

Magnetite powder ("TS-6" manufactured by Mitsui Mining & Smelting Co., Ltd.) was mixed with commercially available NBKP ("Mackenzie" manufactured by British Columbia Forest Products Ltd.) adjusted to a Canadian degree of beating of 500 ml at a ratio of 98.5:1.5 (weight ratio) to prepare handmade paper with a metric basis weight of 85 g/m$^2$ according to JIS P 8222 to obtain identification functional paper of Comparative Example 1.

Comparative Example 2

Handmade paper with a metric basis weight of 85 g/m$^2$ was prepared according to JIS P 8222 using only commercially available NBKP ("Mackenzie" manufactured by British Columbia Forest Products Ltd.) adjusted to a Canadian degree of beating of 500 ml to obtain identification functional paper of Comparative Example 2.

The breaking length was measured according to JIS P 8113 and the bursting strength was measured according to JIS P 8112 as the strength properties of the identification functional paper obtained in Examples 1 to 4 and Comparative Examples 1 and 2. The identification functional paper was sufficiently dried at 110° C. and sintered at 900° C. The content of the magnetic material was measured by weighing the identification functional paper.

The magnetic material residual rate in the identification functional paper was calculated from the amount of the magnetite included in the magnetized fibers of Examples 1 to 4 (30 wt %) and the amount of the magnetite included in the identification functional paper. In Comparative Example 1, the magnetic material residual rate in the identification functional paper was calculated from the amount of the magnetite powder mixed and the amount of the magnetite included in the identification functional paper.

The measurement results are shown in Table 1.

TABLE 1

| | Example 1 | Example 2 | Example 3 | Example 4 | Comparative Example 1 | Comparative Example 2 |
|---|---|---|---|---|---|---|
| Breaking length (km) | 6.64 | 6.70 | 6.15 | 6.73 | 6.68 | 6.80 |
| Bursting strength (kPa · m$^2$/g) | 517 | 536 | 498 | 561 | 543 | 567 |
| Magnetic material content (wt %) | 1.37 | 0.29 | 1.40 | 0.03 | 0.61 | 0.0 |
| Magnetic material residual rate (wt %) | 91.3 | 96.7 | 93.4 | 99.5 | 40.7 | — |

As shown in Table 1, the identification functional paper obtained in Examples 1 to 4 had excellent strength properties.

(Measurement of Magnetic Response Properties)

In order to evaluate the counterfeit prevention function of the identification functional paper obtained as described above, the magnetic response properties of the identification functional paper (identification cards) of Examples 1 to 4 and Comparative Examples 1 and 2 were measured by the above-described method.

The measurement was conducted using the magnetic response property measurement device shown in FIG. 1.

FIG. 2 shows a time-based graph drawn by sampling the waveform output from the divider 4 at a point E shown in FIG. 1. In code generation, the waveform was converted into "0" or "1" according to a predetermined rule and was output to the monitor as a 12-digit value (encryption).

The identification functional paper of Examples 1 to 4 and Comparative Examples 1 and 2, three pieces each, was prepared, and specific specimen names were provided as Example 1-A, Example 1-B, and Example 1-C corresponding to each lot.

A specific portion of each specimen was measured using the magnetic response property measurement device. The measurement was conducted three times for each specimen, and the following items (i) and (ii) were evaluated.

(i) Measurement of Change in Signal Caused by Magnetic Material (Response Properties)

A case where a change in signal caused by the magnetic material could be measured was evaluated as "Good", and a case where a change in signal caused by the magnetic material could not be measured was evaluated as "Bad".

(ii) Reproducibility of Waveform when Measuring Single Specimen Two or More Times (Reproducibility)

A case where reproducibility of the waveform was observed when measuring a single specimen two or more times was evaluated as "Good", and a case where reproducibility of the waveform was not observed when measuring a single specimen two or more times was evaluated as "Bad".

The results are shown in Table 2.

TABLE 2

| | First measurement | Second measurement | Third measurement | Response properties | Reproducibility |
|---|---|---|---|---|---|
| Example 1-A | 111000011000 | 111000011000 | 111000011000 | Good | Good |
| Example 1-B | 000110001110 | 000110001110 | 000110001110 | Good | Good |
| Example 1-C | 100111100110 | 100111100110 | 100111100110 | Good | Good |
| Example 2-A | 100110001110 | 100110001110 | 100110001110 | Good | Good |
| Example 2-B | 001001110001 | 001001110001 | 001001110001 | Good | Good |
| Example 2-C | 000111001100 | 000111001100 | 000111001100 | Good | Good |
| Example 3-A | 010100100101 | 010100100101 | 010100100101 | Good | Good |
| Example 3-B | 100100101001 | 100100101001 | 100100101001 | Good | Good |
| Example 3-C | 100010010010 | 100010010010 | 100010010010 | Good | Good |
| Example 4-A | 001011000100 | 001011000100 | 001011000100 | Good | Good |
| Example 4-B | 100101101000 | 100101101000 | 100101101000 | Good | Good |
| Example 4-C | 100010001100 | 100010001100 | 100010001100 | Good | Good |
| Comparative Example 1-A | 100100010000 | 100100000000 | 100100000010 | Good | Bad |
| Comparative Example 1-B | 000110000000 | 000110000000 | 000110000000 | Good | Good |
| Comparative Example 1-C | 001100010000 | 000100000000 | 001100010000 | Good | Bad |
| Comparative Example 2-A | 000000000000 | 000000000000 | 000000000000 | Bad | — |
| Comparative Example 2-B | 000000000000 | 000000000000 | 000000000000 | Bad | — |
| Comparative Example 2-C | 000000000000 | 000000000000 | 000000000000 | Bad | — |

As shown in Table 2, the identification functional paper of Examples 1 to 4 exhibited excellent response properties and reproducibility, and magnetic response properties and magnetic reproducibility that withstand practical use were recognized. On the other hand, Comparative Example 1 lacks reproducibility due to changes in the waveform in each measurement and the like. Moreover, the response signal intensity was generally low. The waveform could not be detected in Comparative Example 2 due to the absence of the magnetic material.

(Genuineness Test)

A genuineness test was further conducted.

Each specimen for which the magnetic response properties and magnetic reproducibility were obtained in the measurement of the magnetic response properties was recorded in a database while associating the resulting 12-digit numerical value information with each specimen's name. The operation of making the database was performed on a personal computer.

The measurement was performed in the same manner as described above for one piece of identification functional paper selected from all the specimens. Whether or not the specific information in the identification functional paper could be identified was examined using a program which compares the resulting value with the values in the database, displays the specimen's name on the monitor when the 12-digit values coincide, and displays a "false" message when the 12-digit values do not coincide. The measurement was performed three times. When the measured values of three measurements did not coincide or a magnetic waveform was not detected in three measurements, a "false" message was displayed.

The display results are shown in Table 3.

TABLE 3

| Judgment No. | Specimen | First measurement | Second measurement | Third measurement | Response properties | Reproducibility | Monitor display |
|---|---|---|---|---|---|---|---|
| 1 | Comparative Example 1-A | 100100010000 | 100100000000 | 100100000010 | Good | Bad | False |
| 2 | Example 1-B | 000110001110 | 000110001110 | 000110001110 | Good | Good | Example 1-B |
| 3 | Comparative Example 1-B | 000110000000 | 000110000000 | 000110000000 | Good | Good | Comparative Example 1-B |
| 4 | Comparative Example 2-C | 000000000000 | 000000000000 | 000000000000 | Bad | — | False |

TABLE 3-continued

| Judgment No. | Specimen | First measurement | Second measurement | Third measurement | Response properties | Reproducibility | Monitor display |
|---|---|---|---|---|---|---|---|
| 5 | Example 2-A | 100110001110 | 100110001110 | 100110001110 | Good | Good | Example 2-A |
| 6 | Comparative Example 2-B | 000000000000 | 000000000000 | 000000000000 | Bad | — | False |
| 7 | Example 1-A | 111000011000 | 111000011000 | 111000011000 | Good | Good | Example 1-A |
| 8 | Comparative Example 2-A | 000000000000 | 000000000000 | 000000000000 | Bad | — | False |
| 9 | Example 1-C | 100111100110 | 100111100110 | 100111100110 | Good | Good | Example 1-C |
| 10 | Example 2-B | 001001110001 | 001001110001 | 001001110001 | Good | Good | Example 2-B |
| 11 | Comparative Example 1-C | 001100010000 | 000100000000 | 001100010000 | Good | Bad | False |
| 12 | Example 2-C | 000111001100 | 000111001100 | 000111001100 | Good | Good | Example 2-C |

As is clear from the results shown in Table 3, it was confirmed that the identification functional paper obtained in Examples 1 and 2 have a counterfeit prevention function since the identification functional paper could be identified using the magnetic properties and the database. Comparative Example 1 showed an insufficient counterfeit prevention function due to poor measurement reproducibility and low signal intensity. Comparative Example 2, in which a magnetic signal was not detected, did not have a counterfeit prevention function.

Obviously, numerous modifications and variations of the present invention are possible in light of the above teachings. It is therefore to be understood that, within the scope of the appended claims, the invention may be practiced otherwise than as specifically described herein.

The invention claimed is:

1. An identification functional paper comprising a magnetized fiber comprising hollow fiber having an inner cavity filled with a magnetic material, wherein the magnetized fiber is manufactured by a process comprising the steps:

(i.) dispersing natural or artificial hollow fibers in a metal salt aqueous solution containing a water-soluble salt of a metal which forms the magnetic material;

(ii.) adding alkali to the resulting fiber dispersion liquid in an inert gas atmosphere to obtain a metal hydroxide solution; and (iii.) oxidizing the resulting metal hydroxide to obtain the magnetic material.

2. The identification functional paper according to claim 1, wherein the magnetic material is present in said fiber in an amount of 25 to 45 wt%.

3. The identification functional paper according to claim 2, comprising the magnetized fiber in an amount of 0.001 to 30 wt%.

4. The identification functional paper according to claim 3, wherein said magnetic material is present in said paper in an amount of 0.01 to 10 wt%.

5. The identification functional paper according to claim 1, comprising the magnetized fiber in an amount of 0.001 to 30 wt%.

6. The identification functional paper according to any of claims 1 to 5, wherein said magnetic material is present in said paper in an amount of 0.01 to 10 wt%.

7. The identification functional paper according to claim 1, wherein said magnetic material is selected from the group consisting of magnetite, manganese ferrite, and manganese zinc ferrite.

8. The identification functional paper according to claim 1, wherein a breaking strength (km) of said paper is 5 to 8.

9. The identification functional paper according to claim 1, wherein the bursting strength (kPa $m^2/g$) of said paper is 200 to 600.

10. An identification card comprising an identification functional paper which comprises a magnetized fiber comprising hollow fiber having an inner cavity filled with a magnetic material, wherein the magnetized fiber is manufactured by a process comprising the steps:

(i.) dispersing natural or artificial hollow fibers in a metal salt aqueous solution containing a water-soluble salt of a metal which forms the magnetic material;

(ii.) adding alkali to the resulting fiber dispersion liquid in an inert gas atmosphere to obtain a metal hydroxide solution; and (iii.) oxidizing the resultinzrnetal hydroxide to obtain the magnetic material.

11. An identification card comprising an identification functional paper which comprises a magnetized fiber comprising hollow fiber having an inner cavity filled with a magnetic material, wherein the magnetized fiber is manufactured by a process comprising the steps:

(i.) dispersinginatural or artificial hollow fibers in a metal salt aqueous solution containing a water-soluble salt of a metal which forms the magnetic material;

(ii.) adding alkali to the resulting fiber dispersion liquid in an inert gas atmosphere to obtain a metal hydroxide solution; and (iii.) oxidizing the resulting metal hydroxide to obtain the magnetic material, wherein said magnetic material is present in said paper in an amount of 0.01 to 10 wt%.

12. A magnetized fiber comprising hollow fiber having an inner cavity filled with a magnetic material, wherein the magnetized fiber is manufactured by a process comprisina the steps:

(i.) dispersing natural or artificial hollow fibers in a metal salt aqueous solution containing a water-soluble salt of a metal which forms the magnetic material;

(ii.) adding alkali to the resulting fiber dispersion liquid in an inert gas atmosphere to obtain a metal hydroxide solution; and (iii.) oxidizing the resulting metal hydroxide to obtain the magnetic material, wherein said magnetic material is selected from the group consisting of magnetite, manganese ferrite, and manganese zinc ferrite.

13. A method of manufacturing an identification functional paper comprising a magnetized fiber comprising hollow fiber having an inner cavity filled with a magnetic material, said method comprising:

(i) dispersing natural or artificial hollow fibers in a metal salt aqueous solution containing a water-soluble salt of a metal which forms the magnetic material;

(ii) adding alkali to the resulting fiber dispersion liquid in an inert gas atmosphere to obtain a metal hydroxide solution; and (iii) oxidizing the resulting metal hydroxide to obtain the magnetic material.

14. The method of claim 13, wherein, in step (i), the metal salt is a ferrous salt or a metal salt containing a ferrous salt and a divalent metal salt and wherein, after dispersing the hollow fibers in the metal salt aqueous solution, ultrasonic processing is conducted in order to cause the metal ions to enter deeply into the hollow fibers.

15. The method of claim 14, in which the divalent metal salt is at least one metal salt selected from the group consisting of manganese, zinc, cobalt, nickel, barium, and strontium salts.

16. The method of claim 13, wherein the inert gas in step (ii) is at least one gas selected from the group consisting of nitrogen gas and helium gas.

17. The method of claim 13, wherein the oxidation in step (iii) is conducted by blowing oxygen gas or air into the metal hydroxide solution, or by adding a hydrogen peroxide oxidizing agent to the metal hydroxide solution.

18. An identification card comprising an identification functional paper which comprises a magnetized fiber comprising hollow fiber having an inner cavity filled with a magnetic material, wherein the magnetized fiber is manufactured by a process comprising the steps:

(i.) dispersing natural or artificial hollow fibers in a metal salt aqueous solution containing a water-soluble salt of a metal which forms the magnetic material;

(ii.) adding alkali to the resulting fiber dispersion liquid in an inert gas atmosphere to obtain a metal hydroxide solution; and (iii.) oxidizing the resulting metal hydroxide to obtain the magnetic material, wherein the magnetic material is present in said fiber in an amount of 25 to 45 wt% and wherein said magnetic material is present in said paper in an amount of 0.01 to 10 wt%.

19. An identification card comprising an identification functional paper which comprises a magnetized fiber comprising hollow fiber having an inner cavity filled with a magnetic material, wherein the magnetized fiber is manufactured by a process comprising the steps:

(i.) dispersing natural or artificial hollow fibers in a metal salt aqueous solution containing a water-soluble salt of a metal which forms the magnetic material;

(ii.) adding alkali to the resulting fiber dispersion liquid in an inert gas atmosphere to obtain a metal hydroxide solution; and (iii.) oxidizing the resulting metal hydroxide to obtain the magnetic material, wherein the magnetic material is present in said fiber in an amount of 25 to 45 wt%, the magnetized fiber is present in said paper in an amount of 0.001 to 30 wt%, and the magnetic material is present in said paper in an amount of 0.01 to 10 wt%.

* * * * *